J. L. WENTZ.
BELT CONVEYER.
APPLICATION FILED MAR. 7, 1910. RENEWED DEC. 3, 1910.
1,014,106.
Patented Jan. 9, 1912.
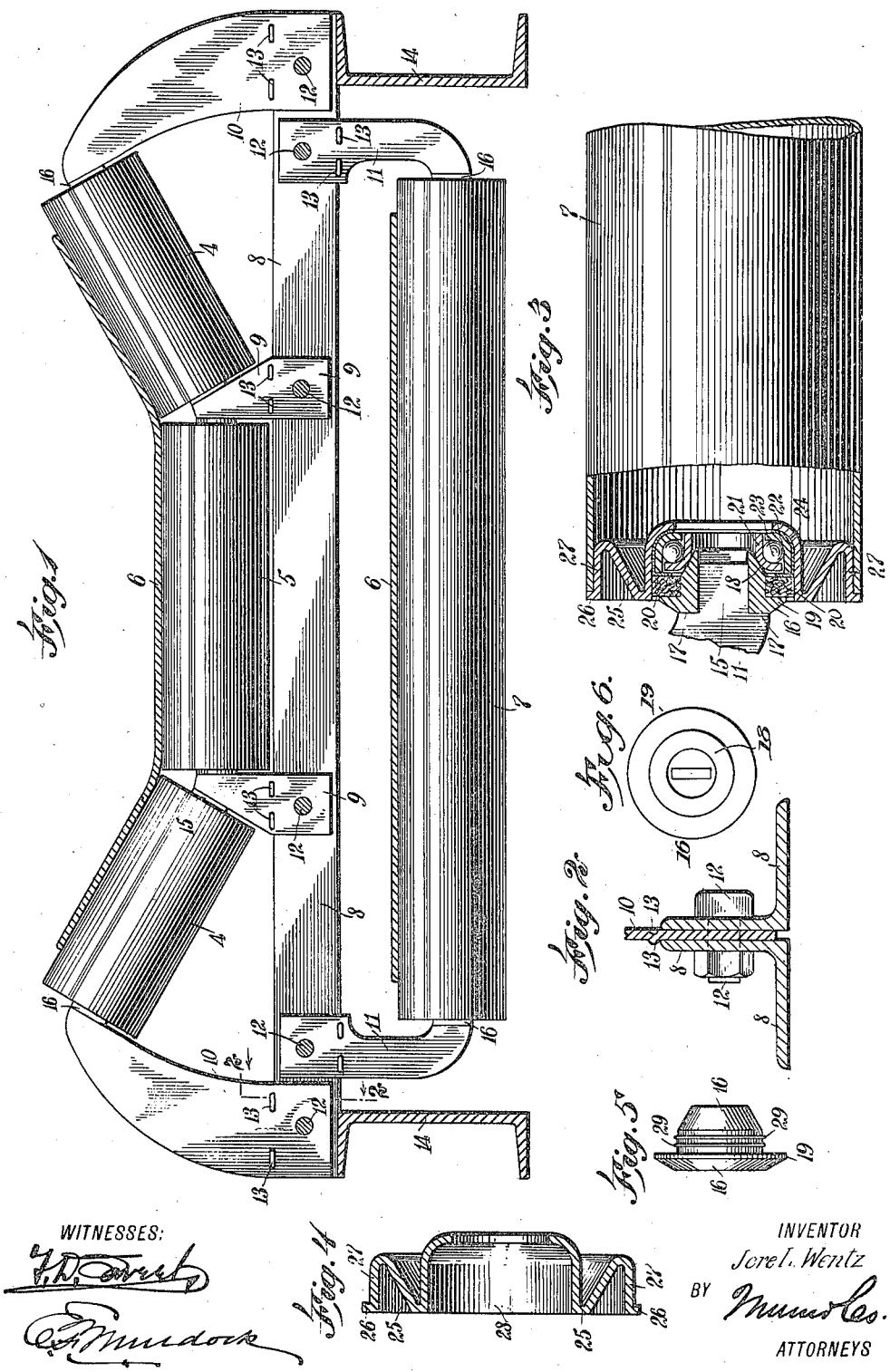
WITNESSES:
INVENTOR
Jere L. Wentz
BY
ATTORNEYS

UNITED STATES PATENT OFFICE.

JERE L. WENTZ, OF PASSAIC, NEW JERSEY, ASSIGNOR TO ROBINS CONVEYING BELT COMPANY, A CORPORATION OF NEW JERSEY.

BELT CONVEYER.

1,014,106.  Specification of Letters Patent.  Patented Jan. 9, 1912.

Application filed March 7, 1910, Serial No. 547,668. Renewed December 3, 1910. Serial No. 595,846.

*To all whom it may concern:*

Be it known that I, JERE L. WENTZ, a citizen of the United States, and a resident of Passaic, in the county of Passaic and State of New Jersey, have invented new and useful Improvements in Belt Conveyers, of which the following is a clear, full, and exact description.

The improvements relate particularly to the supporting structures comprising carrier or idler rollers and their mountings for supporting at intervals the belt of a belt conveyer.

Among the principal objects of the present invention in its most preferred form are: to provide a construction of carrier rollers or idler rollers and their mountings for belt conveyers which is of light weight; to provide a construction for the carrier rollers wherein heavy castings or forged metal parts are replaced by plate metal parts of lighter and simpler construction; to provide a construction and mounting for the carrier rollers which is economical, efficient and durable; to provide mountings for the said rollers readily and quickly replaced and simple in construction; to provide a novel form of bearing connection for the carrier rollers adapted for use on plate metal structures; and to provide a general structural assembly for the carrier frame which is light, strong and rigid.

One embodiment of the present invention is disclosed in the structure illustrated in the accompanying drawings, in which like characters of reference denote corresponding parts in all the views, and in which—

Figure 1 is an elevation of one set of carrier rollers and their supports constructed and arranged in conformity with the present invention, the belt, stringers, and bolts 12 being in section and one of the pair of bars 8 removed; Fig. 2 is a cross section of the carrier bar taken on the line 2--2 in Fig. 1; Fig. 3 is a detail view on a larger scale partly in longitudinal section, showing the construction and assembly of the heads and bearings for the carrier rollers; Fig. 4 is a vertical section of one of the heads for the carrier rollers; and Fig. 5 is a detail view in side elevation of the bearing block employed by me and Fig. 6 is an end view of the block.

The form of belt conveyer illustrated in the drawings is that known in the art as troughing, rollers 4, 4 and 5 being arranged in a set as shown and the rollers 4, 4 being inclined upward from the horizontal plane in which the roller 5 is mounted. The flexible belt 6 is carried by the rollers 4, 4 and 5 and extends over successive sets thereof throughout the length of the conveyer, forming, by reason of the angular disposition of the said rollers, a continuous traveling trough. The trough-like arrangement is usually carried from the receiving to the delivering station of the said conveyer. The belt 6 is of endless construction, and is supported in its return by a series of flat idler rollers 7.

The rollers 4, 4, 5 and 7 are mounted upon brackets fixedly secured to cross bars 8. The bars 8 may be constructed of any suitable material, parallel angle bars being by me preferred. The brackets 9, 9, 10, 10 and 11, 11 are preferably plate metal as shown and are fixedly mounted between the standing flanges of pairs of bars 8, and secured therein by screw bolts 12, 12. The said brackets are held in rigid alinement in their position between the said bars 8 with the aid of alining lugs 13, 13 driven through perforations in the said brackets, or forced out from the metal of the brackets, as shown in Fig. 2 of the drawings. The lugs 13 are disposed, as shown in Fig. 2 of the drawings, to closely engage and fit the edge of one of the bars 8. The cross bars 8 rest upon and are supported by stringers 14, 14, which, in the present construction, are formed from channel beams of suitable height. The stringers 14, 14 are supported by suitable structural devices.

The various brackets 9, 9, 10, 10 and 11, 11 are shaped to suit the structural arrangement of carrier rollers for which they are designed. The brackets 9, 9 are provided to support the horizontal roller 5, and support one end of the inclined rollers 4, 4. For this purpose end lugs 15 project in line toward the center of each of the said rollers. The said lugs are set out from the brackets 9, 9 to receive the bearings of the rollers 4, 4 alining with the lugs extended from the upper end of the outer brackets 10, 10. In all connections between brackets and rollers the assembly is made in the manner shown in Fig. 3 of the drawings, wherein is shown a forged metal bearing block 16 with a central perforation in which is driven the lug 15. To form the lug 15 the metal of the bracket is cut away to provide squared shoulders 17, 17, to receive and hold the back of the block 16 in proper position for securing the desired approximate alinement with the axis of the roller. At the opposite end of the said block is formed a cone seat 18 which approximates sufficiently the zone of a spherical surface which a mathematically exact construction would call for. Between the seat 18 and the back of the block is formed an annular flange 19; which is fitted to hold a felt or soft packing 20, to serve as a preventive against the admission of dust or grit to the seat 18 and to the bearing for the roller. To assist in holding the said soft packing, each of the said blocks 16 is provided with the knife-edged flanges 29. These flanges cut or press into and hold the said packing.

The bearing illustrated in Fig. 3 of the drawings is the usual type of nested and mounted ball bearing. It consists essentially of annular plates 21 and 22, oppositely cupped to form a race for the balls 23. The plates 21 and 22 are held in nested relation by a bent keeper plate 24. The plate 21 rests on the cone seat 18 of the block 16 when assembled to form a conveyer constructed as per the present invention.

The rollers 4, 5 and 7 are constructed from metal tubing, the thickness of the walls whereof varies according to design. The ends of the tubes are closed by heads 25. The heads 25 are pressed from plate or sheet metal to the form shown in Fig. 4 of the drawings. The form provides for an annular flange 26 upturned and shaped to receive in flush relation the wall of the roller. The metal adjacent to the flange 26 is extended horizontally or parallel with the wall of the tube forming the said roller, and in such position as to form close contact with the inner surface of the said tube. Each head 25 is pressed into the tube, the inner surface of the tube and the outer surface of the shoulders 27 are an accurate fit and are truly concentric with the inner wall of a pocket 28 formed to receive in accurate disposition the bearings. The heads are held in the tubes forming the rollers in any suitable manner, that preferred by me being what is known as a squeeze or driving fit. It will be seen that with rollers thus constructed the removal of the heads or bearings, either for repair or replacement, is easily and readily accomplished. It will also be seen that the various parts constituting the conveyer parts shown are readily and easily removed.

While the form and arrangement of the rollers as illustrated in Fig. 1 is in the shape of a carrying trough, formed from three rollers only, it will be understood that the disposition and number of rollers may be changed to suit the convenience and desire of the user. The variety and shapes in cross section of the troughs employed in this art may all be formed using the elements above described in increased or decreased number. It will also be understood that the rotatable bearings, herein shown as a caged ball bearing, may be varied, using any known and suitable form of bearing device or devices. Moreover, although the presence of the ball plate 21 is desirable instead of having the balls directly run on the surface 18 of the block 16 it is not necessary if the cone surface 18 is finished and hardened, as will be readily understood. Particularly when these inner ball plates 21 are used, it will be seen that the cones 18 approximating a zone of a spherical surface allow very considerable deviation of the rollers from a true alinement by permitting an adjustment of the bearings upon such surface without destroying the proper operation of the entire bearing or its relation to the axis of the roller. This obviates a great deal of care in alining the rollers and contributes both to cheapness and durability of the structure.

Having thus described one form of my invention, what I claim as new and desire to secure by Letters Patent is:—

1. A conveyer belt supporting structure comprising one or more laterally disposed supporting bars having vertical extension, a plurality of carrying brackets mounted on said bars and having projections for alinement with said bars, a plurality of rollers having bearings mounted at the ends thereof, and a plurality of cone bearing blocks mounted on said brackets and disposed to receive the said bearings.

2. A conveyer belt supporting structure comprising one or more cross bars having vertical extension, a plurality of carrying brackets formed from plate metal and having extension in the line of resistance, means formed on said brackets for alining the same with said cross bars, bearing blocks adapted to be mounted upon the ends of said brackets, and a plurality of tubular conveyer rollers having heads provided with bearings adapted to receive in supported relation the said bearing blocks.

3. A conveyer belt supporting structure comprising one or more cross bars having vertical extension, a plurality of carrying brackets formed from plate metal and having extension in the line of resistance, means formed on said brackets for alining the same with said cross bars, a plurality of bearing blocks adapted to be forced over the ends of said brackets to be held thereby, a plurality of tubular conveyer rollers having supporting heads, and a plurality of bearings mounted in said heads and held in supported relation upon said bearing blocks.

4. A conveyer belt supporting structure comprising one or more cross bars having vertical extension, a plurality of carrying brackets fixedly secured on said cross bars formed from plate metal, means formed on said brackets for alining the same with said cross bars, a plurality of bearing blocks having conical ends and a central perforation adapted to be extended over the ends of said brackets to be held thereon, a plurality of conveyer rollers, a plurality of heads for said rollers having an outwardly opening centrally disposed recess, and a plurality of bearings adapted to be held within said recesses and to receive the cones of said bearing blocks.

5. A conveyer belt supporting structure comprising one or more cross bars having vertical extension, a plurality of stringers for supporting said cross bars, a plurality of conveyer rollers disposed in trough-like arrangement, a plurality of carrying brackets for supporting said rollers, said brackets being formed from plate metal and fixedly attached to said cross bars, said cross bars having horizontal flange members for connecting them to the said stringers adapted to maintain the vertical position of said cross bars.

6. A conveyer belt supporting structure comprising carrying brackets formed from plate metal and having constructed thereon alining members for governing the structural placement of said brackets, said brackets having engaging projections, and a plurality of bearing blocks having central perforations adapted to receive in supported relation the said engaging projections.

7. A conveyer belt supporting structure comprising carrying brackets formed from plate metal and having constructed thereon alining members for governing the structural placement of said brackets, said brackets having engaging projections extended from squared bearing shoulders, a plurality of bearing blocks having central perforations adapted to receive in supported relation the said engaging projections and to rest on the bearing shoulders.

8. A conveyer belt supporting structure comprising carrying brackets formed from plate metal and having constructed thereon alining members for governing the structural placement of said brackets, said brackets having engaging projections extended from squared bearing shoulders, and a plurality of bearing blocks having central perforations adapted to receive in supporting relation the said engaging projections and to rest on the bearing shoulders, said blocks each having on the one end an outwardly extended cone bearing and on the other end a bearing surface adapted to rest upon the said bearing shoulders of the said brackets.

9. A conveyer belt supporting structure comprising a plurality of conveyer rollers disposed in trough-like arrangement, said rollers being formed from metal tubes, a plurality of heads for said rollers pressed from plate metal to form supporting shoulders for the walls of said rollers and centrally disposed outwardly opening recesses a plurality of bearing members fitted within said recesses, a plurality of bearing blocks having a central perforation and adapted to engage said bearing members to form bearing supports for said rollers, and a plurality of carrying brackets for said rollers constructed from plate metal and having lateral projections extended in line with the center of said rollers and adapted to be engagingly inserted within the perforation in said bearing blocks.

10. A conveyer belt supporting structure comprising a plurality of conveyer rollers disposed in trough-like arrangement, said rollers being formed from metal tubes, a plurality of heads for said rollers pressed from plate metal to form supporting shoulders for the walls of said rollers and centrally disposed outwardly opening recesses a plurality of bearing members fitted within said recesses, a plurality of bearing blocks having cone-shaped ends adapted to engage said bearing members to form supports for said rollers, and a plurality of carrying brackets for said rollers, constructed from plate metal and having lateral projections extended in line with the center of said rollers and adapted to be engagingly inserted within the perforation in said bearing blocks.

11. A conveyer belt supporting structure comprising a plurality of conveyer rollers disposed in trough-like arrangement, said rollers being formed from metal tubes, a plurality of heads for said rollers pressed from plate metal to form supporting shoulders for the walls of said rollers and centrally disposed outwardly opening recesses a plurality of bearing members fitted within said recesses, a plurality of bearing blocks having a cone-shaped end adapted to engage the said bearing members, the backs of said blocks being perpendicular to the central line of said rollers, and a plurality of carrying brackets for said rollers constructed from plate metal and having lateral projections extended in line with the center of said rollers and forming bearing shoulders for said bearing blocks on the body portion of said brackets adjacent to said extensions, said extensions adapted to be engagingly inserted within the perforation in said bearing blocks.

12. A conveyer belt supporting structure comprising one or more cross bars having vertical extension a plurality of conveyer rollers having heads forming supporting bearings for said rollers, said rollers being disposed above and below said cross bars, and a plurality of carrying brackets fixedly mounted on said cross bars, said brackets being formed from plate metal and having alining devices arranged to engage the said cross bars to fix the position of said brackets.

13. A conveyer belt supporting structure comprising one or more supporting cross bars, each having vertically and horizontally extended flanges, a plurality of carrying brackets constructed from plate metal and fixedly attached to the vertically extended flanges of said bars, said brackets having lateral engaging extensions projected in line with the centers of the conveyer rollers, a plurality of stud-like bearing blocks fixedly mounted upon said extensions, and a plurality of conveyer rollers having bearings formed in the ends thereof arranged to receive in supported relation the said bearing blocks.

14. A conveyer belt supporting structure comprising one or more supporting cross bars, each having vertically and horizontally extended flanges, a plurality of carrying brackets constructed from plate metal and fixedly attached to the vertically extended flanges of said bars, said brackets having lateral engaging extensions projected in line with the centers of the conveyer rollers, a plurality of stud-like bearing blocks fixedly mounted upon said extensions, and a plurality of conveyer rollers having bearings formed in the ends thereof arranged to receive in supported relation the said bearing blocks, one of said rollers being mounted to extend parallel with said cross bars and in close relation thereto and disposed to support in flat extended position the conveyer belt, and other rollers being disposed in trough-like arrangement.

15. In a supporting structure comprising a plurality of rollers arranged end to end, the combination of two adjacent rollers, an intermediate supporting bracket for the two rollers provided with bearing-supporting projections directed toward the respective rollers, bearing blocks having substantially conical surfaces mounted upon said projections, and ball bearings carried by the rollers and coöperating with the said blocks.

16. In a supporting structure comprising a plurality of rollers arranged end to end, the combination of two adjacent rollers, an intermediate supporting bracket for the two rollers provided with bearing-supporting projections directed toward the respective rollers and with substantially conical faces 18, ball plates loosely carried on such conical faces, ball plates carried by the rollers, and balls therefor, whereby the alinement between the bracket and adjacent two rollers may be varied without affecting the actions of the bearings as described.

17. In a supporting structure comprising one or more rollers and supports therefor the combination of one or more cross bars, two brackets removably secured to the said cross bars, and each having a bearing-block-supporting projection, bearing blocks having conical surfaces and into which the said projections are inserted and a roller having bearing members at each end coacting with the said conical surfaces but free to adjust themselves relatively thereto.

18. In a supporting structure comprising one or more rollers and supports therefor the combination of one or more cross bars, two brackets removably secured to the said cross bars, and each provided with a cone or conical surface, and a roller having bearing members at its respective ends including ball plates 21 loosely mounted on the said cones and free to adjust themselves with the roller relatively thereto and thereby adapted to deviations from true alinement of the said brackets, cones, and roller.

In testimony whereof I have signed my name to this specification in the presence of two subscribing witnesses.

JERE L. WENTZ.

Witnesses:
E. F. MURDOCK,
PHILIP D. ROLLHAUS.